Sept. 14, 1965   C. H. OVERAA   3,205,584
MAGNIFYING MEANS FOR FLEXIBLE SCALES
Filed April 2, 1962   2 Sheets-Sheet 1
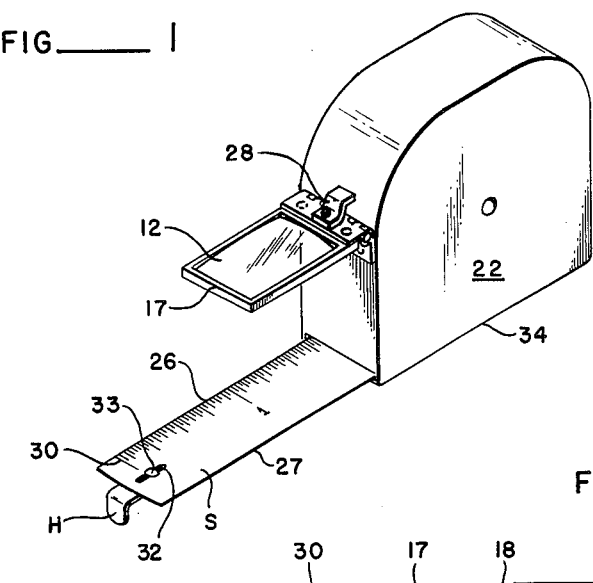
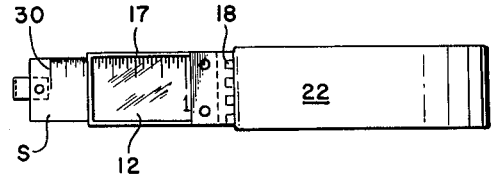
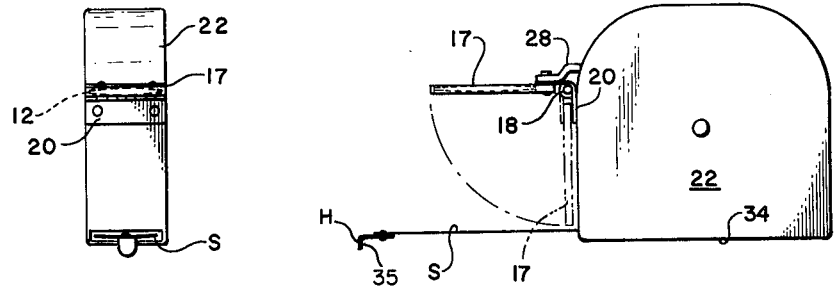
CHARLES H. OVERAA
INVENTOR.
BY *Clarence M. Tuck*
ATTORNEY Sept. 14, 1965  C. H. OVERAA  3,205,584
MAGNIFYING MEANS FOR FLEXIBLE SCALES
Filed April 2, 1962  2 Sheets-Sheet 2
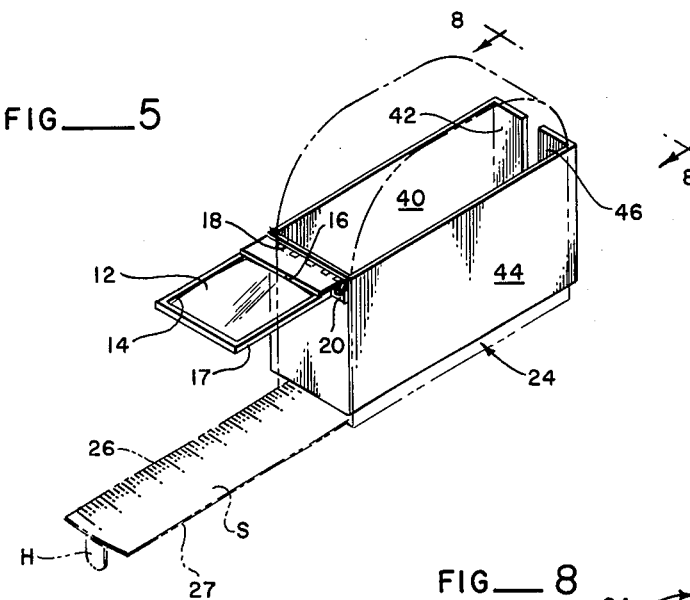
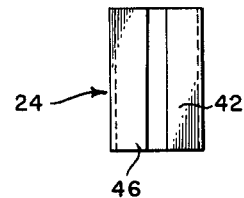
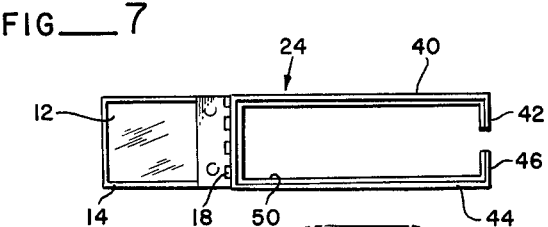
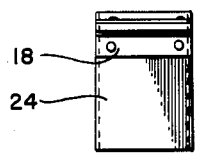
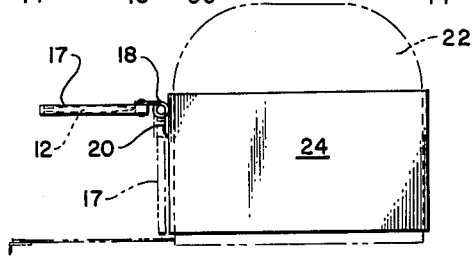
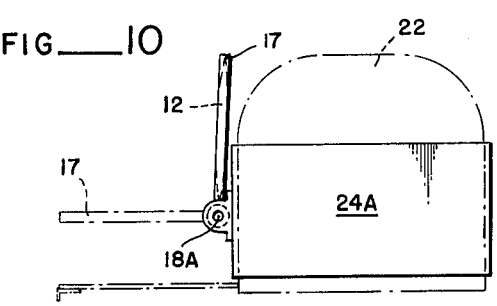
CHARLES H. OVERAA
*INVENTOR.*
BY Clarence M. Tuck
ATTORNEY

United States Patent Office 3,205,584
Patented Sept. 14, 1965

1

3,205,584
MAGNIFYING MEANS FOR FLEXIBLE SCALES
Charles H. Overaa, 13923 Canyon Road E.,
Tacoma 44, Wash.
Filed Apr. 2, 1962, Ser. No. 184,377
4 Claims. (Cl. 33—138)

This present invention relates to the general field of flexible tapes or scales of the type normally supplied with a unitary housing into which the tape, which is of curved scross section, transversely of its length, is normally retrieved by spring biasing provided within the housing. More particularly, this invention relates to a magnifying glass which may be either fixedly or removably secured to the rule housing. The magnifying glass is positioned so that it will be at an optimum position when put into use and when it is not required or the use of the tape has been concluded, the magnifying glass will fold on the end of the tape housing in a manner which will not greatly increase the bulk of the housing and will, in addition, place the magnifying glass in a position where it is not likely to be damaged.

The flexible pocket rule or tape is generally characterized by having its own housing into which it is retrieved by being wound around a spring biased arbor. The tape itself is provided with an arcuate cross-section which increases its stiffness so that it may be held out horizontally for several feet and be self-supporting.

The majority of such scales, or more properly flexible rules, are graduated to ⅟₁₆ of an inch, this being about the finest division that can be practically used. However many attempts have been made to provide smaller graduations of these scales so that they would serve the need of machinists or other craftsmen who require a higher degree of accuracy in certain of their measurements. It naturally follows that if a convenient and reliable magnifying arrangement could be provided, the scales could be graduated to ⅟₃₂ or ⅟₆₄ of an inch or in a decimal manner to show ⅟₅₀ of an inch. I have provided my hingedly mounted magnifying glass so that a workable, practical means for adapting this excellent rule to more exacting uses can be achieved.

A principal object of my present invention, therefore, is to provide a foldable magnifying glass, which, when extended for use, will be at an optimum distance from the tape-like scale, thus enabling a craftsman to work to tolerances of substantially one half or one fourth of those now possible with the existing tapes and the unaided eye.

A further object of this invention is to provide means in which a suitable magnifying attachment can be adapted to the flexible machinists' rules without requiring any further modification of the scale than the supplying of the finer graduations and this can be achieved without substantially effecting the housing in which the tape-like scale is retrieved and stored.

A further object of this invention is to provide a hinged magnifying glass which may be secured to the conventional scale housing without appreciably increasing its bulk so that it can still be carried in the pocket of the user as conveniently as are the usual scales now employed.

A further object of this invention is to provide an auxiliary slip-on resilient clamp means or adapter which can be secured to the conventional tape housing and which in turn will position the magnifying glass properly while adding very little bulk to the housing.

A further object of this present invention and a very important one is to provide a hinged mounting that will hold the lens in proper relationship, particularly transversely of the tape so that an undistorted enlarged image of the calibrations of the scale may be easily and accurately read.

A further object of this invention is to provide a magnifying glass of most acceptable type which can be employed to enlarge the graduations on a flexible scale so as to prevent unnecessary eyestrain on the part of the persons using the equipment, even though they may have impaired vision Further objects, advantages and capabilities will be apparent from the disclosure in the drawings or may be comprehended or are inherent in the device.

In the drawings:

FIGURE 1 is a perspective view illustrating a preferred embodiment of my present invention.

FIGURE 2 is a top plan view of the tape and equipment shown in FIGURE 1.

FIGURE 3 is a side elevation of FIGURE 1.

FIGURE 4 is a front view showing the magnifying glass in its extended position.

FIGURE 5 is a perspective view illustrating a modified structure in the form of an adapter to make my device usable on scales already in use.

FIGURE 6 is a side elevation of FIGURE 5.

FIGURE 7 is a top plan view of the modified form shown in FIGURE 5.

FIGURE 8 is an end elevation taken substantially along the viewing line 8—8 of FIGURE 5.

FIGURE 9 is a front elevation of the form of my device shown in FIGURE 5.

FIGURE 10 is a modified view showing the magnifying glass as pivoted about midway, vertically, of the adapter support means 24a.

Referring to the drawings, throughout which like reference characters indicate like parts, the numeral 12 indicates the type of magnifying glass I prefer to use in this present invention. In constructing this magnifying glass it has been found very desirable to employ the so-called circular double convex magnifying glass and to then trim its edges so as to reduce the portion shown to a rectangular form which is more easily adapted to this present device without losing the over-all virtues of the double convex type of magnifying glass. In stressing the form of magnifying glass from which my lens is made, it is desirable to point out that magnification should be equal in all directions as distinct from many of the elongated magnifying glasses that are curved only in one plane and thus magnify only vertically or horizontally as the case may be. It is to be noted, particularly in FIGURE 5 that lens 12 is a central portion from a double convex lens. The two lines of trimming 14 and 16, as shown in FIGURE 5, show this curvature and this factor is believed to be very important in giving an accurate or precise image on an increased scale of the graduations of the rule and the edge or line to which the measurement is being taken. The double curvature is indicated further in FIGURES 1, 3, 4 and 6.

The rectangular lens 12 is secured within a suitable enclosing marginal frame 17 and this frame is in turn hingedly secured, as by the piano type hinge indicated at 18, throughout the various illustrations of the drawings. However, it should be possible to use various other types of hinges including a ball or universal type as indicated at 18a in FIGURE 10. This latter type would require readjustment each time it is used. The downwardly extending portion 20 of hinge 18 is preferably fixedly secured as to the tape housing proper 22 or to the adapter support means shown at 24 or in a modified form 24a. In each case it is desirable to point out that the axis of hinge 18 should be at right angles to scale S, considering the longitudinal axis of the scale, and should further be parallel to the plane established by the opposite edges 26 and 27, which in effect establish the transverse plane of scale S. This is an important feature which establishes the lens in proper relationship with the scale, providing the frame 17 which becomes the plane of the lens 12, is also parallel to the plane of the edges of scale S. It is for these reasons that it is very desirable that an accurate hinge arrangement 18 be provided and that a limiting upper stop be employed to limit the upward or downward swing of frame 17 shown in FIGURE 10, to insure parallelism of the frame to scale S. Such a stop is indicated at 28 in FIGURES 1 and 3.

For a precise scale arrangement in the showing of FIGURES 1 through 4, it has been found desirable not to have graduations extend to the extreme end of the relatively thin scale S. Consequently, in FIGURES 1 and 2, it will be noted that the zero line 30 is back from the edge and should it be desirable, the usual hook H can be fixedly positioned by means of slot 32 and screw 33 so that the preferred edge of the hook can be matched up with the zero line 30. In the more conventional use of my equipment, wherein the adapter 24 is employed, the scale should be brought out to the line corresponding to the inside surface 35 of hook H as is common with flexible scales of this order. Such an arrangement is illustrated in FIGURE 5.

Attention is invited to the folded positions of frame 17 and the enclosed lens 12 as illustrated in FIGURES 3 and 6, wherein it will be noted that the folded position of frame 17 is such that it folds above scale S placing the hinge 18 well up on the housing 22 or on the modified form of resilient adapter 24. This spacing of the pivot or hinge point 18 is approximately two thirds up from base 34 of housing 22. To a degree this positioning of the lens 12 above scale S determines the preferred curvature of the lens so that it will come to a focus on the graduations of scale S when viewed from a point ten to twenty inches above the scale.

Referring more specifically to the modified form of my equipment as illustrated in FIGURES 5 through 9 inclusive, I prefer to employ the identical lens 12 and framework 17 and also the hinge 18 with its downwardly extending portion 20 so that these elements can all be made accurately and will be interchangeable with the preferred form shown in FIGURE 1. The downward extending portion 20 is secured by suitable means to the resilient framework or adapter 24. There are many types of materials suitable for such a frame. The modern plastic materials prove quite suitable and will usually have a reasonably high relative frictional coefficient in respect to the metal case of housing 22 so that they will tend to stay in place well. However, when it is desirable to form adapter 24 from sheet metal, the adapter can be made in the same manner but with the walls proportionately thinner so as to provide the engaging surface 40, the right angle bent portion 42 and its coacting engaging surface 44 and the inwardly directed right angle portion 46. When metal is used it is often desirable to use an inside cushioning of a material 50 having a relatively high coefficient of friction such as neoprene or rubber which can be bonded to the metal. In some instances, felt and similar textiles may be employed.

In using my scale magnifying device the general properties of simple double convex lenses must be recognized. In order to have a clear image of the scale graduation and the reference line or point to which a measurement is being made, the observer should view the same with his eye, the approximate center of lens 12 and the area viewed substantially on a single line of sight and at right angles to the plane of lens 12. It is also necessary that the distance of the viewer's eye from the lens 12 is in keeping with the focal length of the lens 12. A special case is illustrated in FIGURE 10 where a lens of high magnification is employed and it should be positioned closer to the surface of tape S.

It is believed that it will be clearly apparent from the above description and the disclosure in the drawings that the invention comprehends a novel construction of magnifying means for flexible scales.

Having thus described my invention, I claim:

1. A magnifying means for flexible scales having a housing in which said scale is spring returned when its use is completed, comprising:
   (a) a magnifying lens;
   (d) said lens having a spherical surface to insure equal magnification in both directions of said surface;
   (b) a hinged frame for said lens, said hinged frame being hingedly secured to said housing in such a way that the axis of pivot of said hinged frame is above and generally parallel to said scale, said hinged frame being hinged to position it at the proper focal distance from said scale and permitting it to be folded adjacent the housing of said scales, and
   (c) means on said hinged frame for contacting said housing to insure positioning the plane of said magnifying glass parallel to the plane of said scale.

2. A magnifying means for flexible scales having a housing into which said scale is returned when its use is complete, comprising:
   (a) a magnifying lens;
   (b) a hinged frame for said lens, to position it at the proper focal distance from said scale and permitting it to be folded adjacent the housing of said scale;
   (e) a pivot for said hinged frame secured to the enclosing housing of said scale, and
   (d) said lens having a spherical surface to insure equal magnification in both directions of said surface.

3. A magnifying means for flexible scales having a housing into which said scale is returned when its use is completed, comprising:
   (a) a magnifying lens;
   (b) a hinged frame for said lens, to position it at the proper focal distance from said scale and permitting it to be folded adjacent the housing of said scale;
   (f) an adapter having two parallel resilient walls, a joining end wall and right angle bent inwardly directed portions secured to the free ends of said resilient walls;
   (c) means to insure positioning the plane of said magnifying glass parallel to the plane of said scale;
   (d) said lens having a spherical surface to insure equal magnification in both directions of said surface, and
   (e) a pivot for said hinged frame secured to the adapter for said housing of said scale.

4. A magnifying means for flexible scales having a housing in which said scale is spring returned when its use is completed, comprising:
   (a) a magnifying lens;
   (h) a frame for said lens, pivoted to position it at substantially the proper focal distance from said scale and permitting it to be folded adjacent the housing of said scale;
   (f) an adapter having two parallel resilient walls, a joining end wall and right angle bent inwardly directed portions secured to the free end of said resilient walls;
   (i) a pivot, for adjustably supporting said hinged frame, secured to said end wall, and
   (d) said lens having a spherical surface to insure equal magnification in both directions of said surface.

References Cited by the Examiner
UNITED STATES PATENTS

| | | | |
|---|---|---|---|
| 839,599 | 12/06 | Kemler | 88—39 |
| 1,944,567 | 1/34 | Millington | 88—39 |
| 2,011,945 | 8/35 | Mathi | 88—39 |
| 2,367,872 | 1/45 | Kamienski | 88—39 |
| 2,695,454 | 11/54 | Dart | 33—138 |
| 2,807,886 | 10/57 | Aciego | 33—138 X |

ISAAC LISANN, *Primary Examiner.*